3,707,586
HALOGENATED PHOSPHATE POLYESTERS
Richard J. Turley, Orange, Conn., assignor to
Olin Corporation
No Drawing. Filed Feb. 2, 1970, Ser. No. 8,040
Int. Cl. C07f 9/08, 9/12
U.S. Cl. 260—928          11 Claims

ABSTRACT OF THE DISCLOSURE

Halogenated phosphate polyesters, useful as flame retardants for polyurethane foam, are disclosed which have the formula $$RX_a \left[ O - \overset{O}{\underset{\|}{P}}(OR')_2 \right]_n$$

wherein
R is an aliphatic hydrocarbon radical of 1–8 carbons or an aromatic hydrocarbon radical,
X is a halogen,
$a$ is an integer of 0–4,
$n$ is an integer of 2–6, and
each R' is independently a haloalkyl radical.
According to preferred embodiments of the invention, these polyesters are represented by the formula $$\begin{array}{c} R'O \quad O \qquad\qquad O \quad OR' \\ \phantom{R'O}\diagdown\|\phantom{xxxxxxxx}\|\diagup \\ \phantom{xxxxx}P-O-R-O-P \\ \phantom{R'O}\diagup\phantom{xxxxxxxx}\diagdown \\ R'O \qquad\qquad\qquad OR' \end{array}$$

wherein R and R' are as indicated above.

---

This invention relates to a new group of halogenated phosphate polyesters and to their use as flame-retardants in polyurethane foam.

The wide range of utility of polyurethane foam has been somewhat circumscribed by its flammability. Consequently, numerous efforts have been made in recent years to develop ways of imparting flame-retardancy to the foam. Such efforts have produced a variety of fire suppressant or flame-retardant compounds which are either incorporated in the polyurethane pre-polymer mix or applied to the polyurethane after foaming.

The success of a flame-retardant additive for polyurethane foam depends on its meeting at least three requirements. It must first have no detrimental effect on the foam, nor considerably alter the basic properties of the foam. Secondly, it must be relatively easy to produce or obtain and economically feasible to use in the manufacture of foam. Thirdly, the additive must not be fugitive. The term "fugitive" is used to describe a compound whose flame-retardant effectiveness is greatly diminished when foam containing it is subjected to aging.

Many of the flame-retardant additives developed in the art have been found unsatisfactory inasmuch as they do not measure up to all of the above requirements, particularly the last one. As an illustration, a well-known additive, tris(2-chloroethyl)phosphate, is initially effective as a flame-retardant when formulated into a flexible polyurethane foam-forming reaction mixture. However, when the foam is subjected to aging, the flame-retardant effectiveness of the additive is diminished considerably.

It is the primary object of this invention to provide a new group of flame-retardant additives which overcome the drawbacks of the prior art. Another object is to provide a new group of halogenated phosphorus compounds which are easy to prepare and economically feasible to use a flame-retardants in polyurethane foam. A further object is to provide flame-retardant additives for polyurethane foam, which additives are non-fugitive, i.e., their effectiveness is not substantially diminished through aging of the polyurethane foam. These and other objects will become apparent from the following description.

It has now been found, in accordance with this invention, that a new group of halogenated phosphate polyesters are highly useful as flame-retardant additives in polyurethane foam and can be employed to accomplish the above objects.

The new phosphate polyesters of the invention are represented by the general formula $$RX_a \left[ O - \overset{O}{\underset{\|}{P}}(OR')_2 \right]_n \qquad I$$

wherein R is an aliphatic hydrocarbon radical containing from 1 to about 8 carbon atoms, or an aromatic hydrocarbon radical;

X is a halogen selected from the group consisting of chlorine, bromine, and mixtures thereof;
$a$ is an integer of 0–4;
$n$ is an integer of 2–6; and
each R' is independently a haloalkyl radical.

These phosphate polyesters are employed as flame-retardants in polyurethane foam by incorporating them in the polyurethane foam-forming mixture prior to foaming. The resulting foam is rendered highly flame-retardant, according to the flammability test described in ASTM–D1692–68, and the flame-retardancy is not substantially diminished by aging of the polyurethane foam.

More in detail, the phosphate polyesters of the invention are prepared, for example, by reacting a bis(haloalkyl)phosphorohalidate, also referred to as di(haloalkyl)monohalophosphate, with a low-molecular-weight polyol. The reaction is illustrated in the following equation $$n(R'O)_2POX' + RX_a(OH)_n \xrightarrow{\text{base}} RX_a \left[ O - \overset{O}{\underset{\|}{P}}(OR')_2 \right]_n \quad II$$

wherein R', R, X, $a$, and $n$ are as indicated above; and X' is a halogen.

The bis(haloalkyl) phosphorohalidate used in preparing the phosphate polyester of the invention can be prepared by reacting a phosphoryl trihalide with an alkylene oxide in the presence of a basic catalyst. This process of preparing the phosphorohalidate is described in detail in U.S. Pat. No. 2,866,809, issued Dec. 30, 1958, which patent is incorporated herein by reference in its entirety.

The bis(haloalkyl)phosphorohalidate used in preparing the phosphate polyesters of the invention are those in which the haloalkyl radical, i.e., R', contains from 1 to about 8 carbon atoms, and preferably from about 2 to about 4 carbon atoms. In addition, the haloalkyl radical contains from 1 to about 4 halogen substituents selected from the group consisting of chlorine, bromine, and mixtures thereof. It is to be understood that the term "haloalkyl radical," as used in the specification and claims herein, means a halogen-substituted hydrocarbon radical containing from 1 to about 8 carbon atoms and from 1 to about 4 halogen atoms selected from the group consisting of chlorine, bromine, and mixtures thereof, the halogens being located at any position in the hydrocarbon chain.

Illustrative phosphorohalidates are the following:

bis(2-chloroethyl)phosphorohalidate
bis(2-bromoethyl)phosphorohalidate
bis(2-chloropropyl)phosphorohalidate
bis(2-bromopropyl)phosphorohalidate
bis(2-chloroisopropyl)phosphorohalidate
bis(2,3-dichloropropyl)phosphorohalidate
bis(2,3-dibromopropyl)phosphorohalidate
bis(2-bromoisopropyl)phosphorohalidate
bis(2,2'-dichloroisopropyl)phosphorohalidate
bis(2,2'-dibromoisopropyl)phosphorohalidate
bis(1,4,4,4-tetrachloro-2-butyl)phosphorohalidate bis(1,4,4,4-tetrabromo-2-butyl)phosphorohalidate
bis(1-bromo-4,4,4-trichloro-2-butyl)phosphorohalidate
bis(2,4,4,4-tetrachlorobutyl)phosphorohalidate
bis(2,4,4,4-tetrabromobutyl)phosphorohalidate
bis(2-bromo-4,4,4-trichlorobutyl)phosphorohalidate
bis(2-chloro-octyl)phosphorohalidate
bis(2-bromo-octyl)phosphorohalidate As indicated in Equation II above, the low-molecular-weight polyol reactant used in preparing the phosphate polyesters of the invention is represented by the formula $RX_a(OH)_n$. In this formula R is a hydrocarbon radical, which may contain one or more double-bond unsaturations, having from 1 to about 8 carbon atoms, and preferably from 1 to about 4 carbon atoms, or an aromatic hydrocarbon radical preferably having from 6 to about 14 carbon atoms. For example, in the case of the diols, R can be ethylene, propylene, butylene, heptylene, octylene, phenylene, butene, heptene, naphthylene, anthrylene, tolulene, ethyl phenylene, xylylene, and so forth.

The number of hydroxyl groups in the low-molecular-weight polyol reactant ranges from 2 to 6, as indicated above. However, diols are preferably employed to prepare the phosphate polyesters of the invention which would thus contain two phosphorous atoms and are represented by the following formula

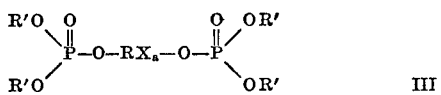

III wherein R', R, X, and $a$ are as indicated above.

Illustrative low-molecular-weight diols which may be employed to prepare the phosphate polyesters of the invention are ethylene glycol, propylene glycol, 2-butylene-1,4-diol, 2-butene-1,4-diol, hydroquinone, resorcinol, 2,4-dihydroxy toluene, catechol, tetrachlorohydroquinone, 2,3-dichloro-2-butene-1,4-diol, 2,3-dibromo-2-butene-1,4-diol, 2,2,3,3-tetrabromobutylene-1,4-diol, 4,4,4-trichlorobutane-1,2-diol, and the like.

Satisfactory results may nevertheless be obtained by using low-molecular-weight polyols having more than two hydroxyl groups such as glycerol, pentaerythritol, 2-ethyl-2-(hydroxymethyl)-1,3-propanediol, the monosaccharides, the polysaccharides, the starches, and other relatively simple, highly hydroxylated compounds.

The low-molecular-weight polyol reactant can have up to 4 halogen substituents on the hydrocarbon chain as noted above with reference to the symbols "$X_a$" in which $a$ is an integer of 0–4. It is preferred, however, to use low-molecular-weight polyols which are free of any halogen substituents, i.e., $a$ is 0.

The reaction illustrated by Equation II above, which is employed to prepare the phosphate polyesters of the invention, is generally carried out at atmospheric pressure and at temperatures below about 60° C. However, higher or lower pressures and temperatures may be used.

The reaction is carried out preferably in the presence of an inert solvent. Any inert organic solvent may be used such as methylene chloride, chloroform, benzene, toluene, and the like.

It is also convenient to carry out the reaction illustrated by Equation II in the presence of a basic catalyst which additionally acts as an acid scavenger. The preferred catalyst is pyridine, although other equivalent bases may be used.

In the most preferred embodiment of the invention, halogen-free, low molecular-weight diols are used to prepare the phosphate polyesters of the invention which are represented by the formula

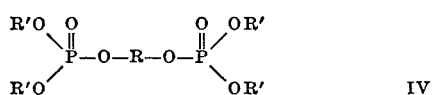

IV in which R, and R' are as indicated above.

Illustrative of the preferred phosphate polyesters of the invention are tetrakis(2-chloroethyl) ethylene diphosphate
tetrakis(2-chloroisopropyl) ethylene diphosphate
tetrakis(2-chloroethyl) p-phenylene diphosphate
tetrakis(2-chloroethyl) m-phenylene diphosphate
tetrakis(2-chloroethyl) tetrachloro-p-phenylene diphosphate
tetrakis(2-bromoethyl) ethylene diphosphate
tetrakis(2-chloroethyl)-2-butene-1,4-diphosphate
tetrakis(2-chloroethyl) 2,3-dibromobutylene-1,4-diphosphate
tetrakis(2-chloroethyl) 2,3-dibromo-2-butene-1,4-diphosphate Although only symmetrical phosphate polyesters are illustrated in the above list, other unsymmetrical polyesters having different haloalkyl radicals, as represented by each R' in Formula III, are contemplated within the scope of novelty and utility of the invention.

The phosphate polyesters of the invention can be utilized as flame-retardants in flexible, semi-rigid and rigid polyurethane foam compositions, the flexible foam compositions being preferred. In preparing the polyurethane foam, either the so-called "one-shot method" or the "semi-prepolymer technique" ("quasi-prepolymer" technique) may be employed. Any combination of polyol components including polyester polyols or polyether polyols, organic polyisocyanate, foaming agent, catalyst, and other reactants capable of forming a cellular urethane material can be used. It is well-known in the art, for example, to prepare flexible polyurethane foam-forming formulations comprising a polyether polyol component having a hydroxyl number of less than about 250, an organic polyisocyanate, a foaming agent, and a catalyst. Typical formulations are described in U.S. Pats. No. 3,072,582, issued Jan. 8, 1963, and No. 3,437,804, issued Oct. 17, 1967, and in Canadian Pat. No. 705,938, issued Mar. 16, 1965.

In utilizing the phosphate polyesters of the invention as flame-retardants for polyurethane foam they are added to the polyurethane foam-forming reaction mixture prior to foaming. Conveniently, they are first blended with the polyol component used in making the foam, and the blend is then added to the other ingredients of the polyurethane foam-forming reaction mixture.

To be fully effective as flame-retardants without adversely affecting or altering the properties of the foam, the phosphate polyesters of the invention are added to the polyurethane foam-forming reaction mixture in the amount of about 5 to about 30 parts per 100 parts by weight of the polyol component used in making the foam. Preferably, 10–25 parts of the phosphate polyester per 100 parts by weight of the polyol component are used.

The following examples are provided to illustrate the invention. In these examples, all parts and percentages given are by weight, unless otherwise specified.

EXAMPLE 1

Tetrakis (2-chloroethyl) ethylene diphosphate

To a solution of two moles of phosphorus trichloride, in 150 mls. of methylene chloride pre-treated with ten drops of ethylene chlorohydrin, a total of 6.9 moles of ethylene oxide were added at 40–60° C. The reaction product was reacted with gaseous chlorine until 1.65 moles of chlorine were consumed. A yield of 82.5 percent of bis(chloroethyl) phosphorochloridate was thus obtained. This product was the directly reacted with 0.8 mole of ethylene glycol in the presence of 1.6 moles of pyridine. This was followed by washing consecutively with aqueous sulfuric acid, water and aqueous ammonium hydroxide. The volatiles (methylene chloride and ethylene dichloride) were then removed by evaporation at reduced pressures to give a 93% yield (based on the amount of PCl₃ used) of product having a refractive index ($n_D^{22}$) of 1.4781. The product was identified by infrared spectrum (hereinafter referred to as IR) as being tetrakis(2-chloroethyl) ethylene diphosphate; and it was found to contain 31.34% chlorine and 12.55% phosphorus (compared to theoretical calculated percentages in $C_{10}H_{22}Cl_4O_8P_2$ of 30.08% chlorine and 13.14% phosphorus).

EXAMPLE 2

Tetrakis(2-chloroisopropyl) ethylene diphosphate

The amount of 15.5 moles of propylene oxide was reacted with 5.06 moles of phosphorus trichloride in 200 mls. of methylene chloride solvent, at 32.50° C. The reaction product was then directly reacted with 5.02 moles of chlorine gas at 30–40° C. The bis(2-chloroisopropyl) phosphorochloridate thus formed was directly reacted with 2.4 moles of ethylene glycol in the presence of 4.8 moles of pyridine. An amount of 50 mls. of acetic anhydride was then added to the reaction mixture. At the end of the reaction, the product was washed consecutively with aqueous sulfuric acid, water and aqueous ammonium hydroxide. The volatiles (methylene chloride and propylene dichloride) were then removed from the phased organic solution by heating at reduced pressures. A 95% yield of product, having a refractive index ($n_D^{30}$) of 1.4673 and identified by IR as tetrakis(2-chloroisopropyl) ethylene diphosphate, was thus obtained. The product was found to contain 28.11% chlorine and 11.23% phosphorus (compared to theoretical calculated percentages in $C_{14}H_{28}Cl_4O_8P_2$ of 26.89% chlorine and 11.74% phosphorus).

EXAMPLE 3

Tetrakis(2-chloroethyl) p-phenylene diphosphate

A total of 1.1 moles of bis(2-chloroethyl) phosphite was reacted with 2.1 moles of carbon tetrachloride in the presence of 2 mls. of triethylamine. The bis(2-chloroethyl) phosphorochloridate thus formed was directly reacted with 0.5 mole of hydroquinone in the presence of 1.1 moles of pyridine. The reaction product was washed with aqueous sulfuric acid, water, and finally with aqueous ammonium hydroxide. After evaporating the carbon tetrachloride solvent and the chloroform which was formed, a 94% yield of product was obtained. This product had a refractive index ($n_D^{20}$) of 1.5093, and was identified by IR as tetrakis(2-chloroethyl) p-phenylene diphosphate. Upon analysis, the product was found to contain 28.05% chlorine and 12.55% phosphorus (compared to theoretical calculated percentages in $C_{14}H_{20}Cl_4O_8P_2$ of 27.31% chlorine and 11.92% phosphorus).

EXAMPLE 4

Tetrakis(2-chloroethyl) tetrachloro-p-phenylene diphosphate

The same procedure and ingredients as used in Example 3, except for the substitution of tetrachlorohydroquinone for hydroquinone, were used to obtain a 62% yield of a solid product having a melting point of 148–151° C. and identified by IR as tetrakis(2-chloroethyl) tetrachloro-p-phenylene diphosphate. The product had a chlorine content of 42.97% and a phosphorus content of 10.03% (compared to theoretical calculated percentages in $C_{14}H_{16}Cl_8O_8P_2$ of 43.16% chlorine and 9.42% phosphorus).

EXAMPLE 5

Tetrakis(2-chloroethyl) m-phenylene diphosphate

A total of 0.84 mole of bis(2-chloroethyl)phosphite was reacted with 1.56 moles of carbon tetrachloride in the presence of 2 mls. of triethylamine. The bis(2-chloroethyl)phosphorochloridate thus formed was reacted with 0.4 mole of resorcinol in the presence of 0.84 ml. of pyridine. The procedure of Example 3 was followed in isolating a 76% yield of product which was identified by IR as tetrakis(2-chloroethyl) m-phenylene diphosphate. This product had a refractive index ($n_D^{25}$) of 1.5050; and, on analysis, was found to contain 28.61% chlorine and 11.85% phosphorus (as compared to theoretical calculated percentages in $C_{14}H_{20}Cl_4O_8P_2$ of 27.31% chlorine and 11.92% phosphorus).

EXAMPLE 6

Tetrakis(2-bromoethyl) ethylene diphosphate

A total of 0.68 mole of bis(2-bromoethyl)phosphite was reacted with excess carbon tetrachloride in the presence of a small amount of triethylamine. The bis(2-bromoethyl) phosphorochloridate thus formed was reacted with 0.31 mole of ethylene glycol in the presence of 0.68 mole of pyridine. The reaction product was washed with aqueous sulfuric acid, water, aqueous sodium bicarbonate, and again with water. The volatiles (chloroform and carbon tetrachloride) were removed by evaporation at reduced pressure to give a 100% yield of product identified by IR as tetrakis(2-bromoethyl) ethylene diphosphate. On analysis, the product was found to contain 49.83% bromine and 9.05% phosphorus (compared to calculated percentages in $C_{10}H_{20}Br_4O_8P_2$ of 49.23% bromine and 9.54% phosphorus).

EXAMPLE 7

Tetrakis(2-chloroethyl)-2-butene-1,4-diphosphate

The amount of 1.9 moles of bis(2-chloroethyl)phosphite was reacted with excess carbon tetrachloride in the presence of a small amount of triethylamine. The bis(2-chloroethyl) phosphorochloridate formed was reacted with 0.86 mole of 2-butene-1,4-diol in the presence of pyridine. The product was isolated in the manner described in the above examples to obtain a yield of 100%. Identified by IR as tetrakis (2-bromoethyl) ethylene diphosphate, the product had a refractive index ($n_D^{22}$) of 1.4852 and contained 29.65% chlorine and 12.24% phosphorus (compared to calculated percentages in

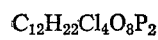

$$C_{12}H_{22}Cl_4O_8P_2$$

of 28.51% chlorine and 12.45% phosphorus).

EXAMPLE 8

Tetrakis(2-chloroethyl)2,3-dibromobutylene-1,4-diphosphate

Bromine was added to a chloroform solution of tetrakis (2-chloroethyl)2-butene-1,4-diphosphate, prepared in Example 7, at 0° C. until the bromine color persisted. The solution was then washed with aqueous sodium bisulfite, water, aqueous sodium bicarbonate, and again with water. The chloroform and other volatiles were then removed by heating at reduced pressures to give a 92% yield of product identified by IR as tetrakis(2-chloroethyl)2,3-dibromobutylene-1,4-diphosphate. On analysis, the product was found to contain 22.34% chlorine, 22.36% bromine and 9.45% phosphorus (compared to calculated percentages in $C_{12}H_{22}Br_2Cl_4O_8P_2$ of 21.58 chlorine, 24.32% bromine and 9.42% phosphorus).

EXAMPLE 9

Tetrakis(2-chloroethyl)2,3-dibromo-2-butene-1,4-diphosphate

The procedure of Example 7 was followed in preparing bis(2-chloroethyl) phosphorochloridate and the product was reacted with 0.86 mole of 2,3-dibromo-2-butene-1,4-diol in the presence of pyridine. The reaction mixture was then washed with aqueous sulfuric acid, water, aqueous sodium bicarbonate, and again with water. Evaporation of the volatiles gave a 95% yield of product which was identified by IR as tetrakis(2-chloroethyl)2,3-dibromo- 2-butene-1,4-diphosphate. On analysis, this product was found to contain 22.36% chlorine, 21.03% bromine, and 9.47% phosphorus (as compared with calculated percentages in $C_{12}H_{20}Br_2Cl_4O_8P_2$ of 21.65% chlorine, 24.39% bromine and 9.45% phosphorus).

EXAMPLE 10

Flame-retardant polyurethane foam

A flexible polyurethane foam-forming reaction mixture was prepared consisting of the following ingredients in the indicated proportions:

Ingredients: Amount
- Oxypropylated glycerin (molecular weight 3,000) _____ gms__ 100.0
- Silicone surfactant (Dow Corning DC-190)[1] _____ mls__ 1.5
- Triethylene diamine _____ mls__ 0.5
- Water _____ mls__ 4.0
- Stannous octoate catalyst _____ mls__ 0.6
- Toluene diisocyanate (80/20 mixture of 2,4 and 2,6 isomers) _____ mls__ 41.0

[1] This surfactant is a block copolymer of polydimethylsiloxane and a polyester resin.

To this mixture 19.4 gms. of tetrakis(2-chloroethyl) ethylene diphosphate were added. Procedurally this was blended in with the oxypropylated glycerin before adding the other ingredients of the foam-forming reaction mixture. The total mixture was then poured into an open-top box and allowed to expand into a flexible foam block which was oven-cured at 95° C. for about 10 minutes, followed by ambient temperature curing for about two days.

A small section of the foam was analyzed and found to contain 1.5% phosphorus and 3.6% chlorine.

The flammability of the foam was tested as described in ASTM–D1692–68. The extent of burning was found to be limited to 1.5 inches, using a standard foam sample 6 inches in length. In 8 seconds the flame was self-extinguished.

The non-fugitivity of the material was demonstrated by subjecting one portion of the foam to a humid-age test and another portion of the foam to a dry-heat-aging test. In the humid-age test, the material was baked in a 121° C. steam autoclave for about five hours. Thereafter, another flammability test, as described in ASTM–D1692–68, was conducted on the material. The test showed a slight decrease in flame-retardancy. The extent of burning was again limited to 1.7 inches, the flame being self-extinguished in 17 seconds.

In the dry-heat-aging test, the material was placed in a 140° C. air-oven for 22 hours. When flame tested thereafter, the material showed no fugitivity at all. The flame was again self-extinguished after consuming 1.5 inches of the sample.

In both the humid and the dry-heat-aging test, no extensive deterioration of the physical properties of the foam was observed; and the extent of discoloration occurring after aging was comparable to that observed for foam without the additive.

EXAMPLES 11–15

Flame-retardant polyurethane foam

The same polyurethane foam-forming reaction mixture of Example 10 was used to prepare five foams, identified as Examples 11 through 15. However, instead of the tetrakis(2-chloroethyl) ethylene phosphate used in Example 10, other phosphate polyesters of the invention were added to the mixture, the identity and proportion of each polyester being indicated in Table 1 below. The foams were then flame tested as described in ASTM–D1692–68. The results are recorded in Table 1.

TABLE 1

| Ex. No. | Phosphate polyester used | Pbw. | ASTM-D1692-68 flame test |
|---|---|---|---|
| 11 | Tetrakis(2-chloroethyl) m-phenylene diphosphate. | 20 | SE, 2.0″.[1] |
| 12 | Tetrakis(2-bromoethyl) ethylene diphosphate. | 20 | SE, 1.4″. |
| 13 | ____do____ | 30 | SE, 1.2″. |
| 14 | Tetrakis(2-chloroethyl) 2,3-dibromobutane-1,4-diphosphate. | 20 | SE, 1.2″. |
| 15 | Tetrakis(2-chloroethyl) 2,3-butene-1,4-diphosphate. | 20 | SE, 1.2″. |

[1] Self-extinguishing, extent of burn 2.0 inches.

EXAMPLE 16

Flame-retardant polyurethane foam

Another foam sample, identified as Example 16, was prepared using the polyurethane foam-forming reaction mixture of Example 10, with 10 parts of tetrakis(2-chloroethyl) ethylene phosphate added. For purposes of comparison, two other foam samples, identified as C–1 and C–2, were prepared again using the reaction mixture of Example 10. In C–1, in place of the tetrakis(2-chloroethyl) ethylene diphosphate, 10 parts of diethylene glycol bis[bis(2-chloroethyl)phosphate] were incorporated in the reaction mixture; and in C–2, 10 parts of tetraethyl ethylene diphosphate were incorporated in the reaction mixture.

After foaming, each of Examples 16, C–1 and C–2, was subjected to a flammability test as described in ASTM–D1692–68. In the case of each of C–1 and C–2, the foam sample was entirely consumed by the flame. Example 16, on the other hand, was found to be self-extinguishing, the extent of the burn being 2 inches.

The above example demonstrates the efficient flame retardancy of the polyesters of the invention at low levels (10 parts) when compared with two known and otherwise similar phosphorus polyesters.

EXAMPLE 17

Flame-retardant polyurethane foam

A foam sample, identified as Example 17, was prepared using the polyurethane foam-forming reaction mixture of Example 10, with 20 parts of tetrakis(2-chloroethyl) ethylene diphosphate added. Again, for purposes of comparison, three other foam samples, identified as C–3, C–4, and C–5, were prepared using the reaction mixture of Example 10. In place of the tetrakis(2-chloroethyl) ethylene diphosphate, in C–3, 20 parts of tetrakis(2-chloroethyl) ethylene diphosphonate were added to the reaction mixture; in C–4, 20 parts of tris(2-chloroethyl) phosphate were added; and in C–5, 20 parts of tris(2,3-chloropropyl) phosphate were added. All of the samples were subjected to a dry-heat-aging test, as described in Example 10. The samples were then examined for the condition of the foam and flame tested as described in ASTM–D1692–68. The results are recorded in Table 2 below.

TABLE 2

| Foam sample | Foam condition | Flame test |
|---|---|---|
| Example 17 | Good | SE, 1.5″.[1] |
| C–3 | Deteriorated | |
| C–4 | Good | B.[2] |
| C–5 | ____do____ | B.[2] |

[1] Self-extinguishing, extent of burn 1.5 inches.
[2] Burned through.

This example demonstrates the superiority of the polyesters of the invention when compared with known and otherwise similar halogenated phosphorus esters, as regards non-fugitivity and absence of adverse effects on the foam as a result of aging.

What is claimed is:
1. Compounds of the formula

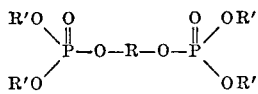

wherein
R is selected from the group consisting of an aliphatic hydrocarbon radical containing from 1 to about 8 carbon atoms and an aromatic hydrocarbon radical containing from 6 to about 14 carbon atoms; and
each R' is independently a haloalkyl radical containing from 1 to about 8 carbon atoms, the halogen in said haloalkyl radical being chlorine, bromine or a mixture thereof.

2. The compounds of claim 1 wherein R' contains from 1 to 4 carbon atoms.

3. The compounds of claim 2 wherein R is selected from the group consisting of an aliphatic hydrocarbon radical containing from 1 to about 4 carbon atoms and phenylene.

4. The compounds of claim 2 wherein said R is selected from the group consisting of ethylene, propylene, butylene, heptylene, octylene, phenylene, butene, heptene, naphthylene, anthrylene, tolulene, ethyl phenylene, and xylylene.

5. The compounds of claim 3 selected from the group consisting of
tetrakis(2-chloroethyl)ethylene diphosphate,
tetrakis-(2-chloroisopropyl)ethylene diphosphate,
tetrakis(2-chloroethyl)p-phenylene diphosphate,
tetrakis(2-chloroethyl)m-phenylene diphosphate,
tetrakis(2-bromoethyl)ethylene diphosphate, and
tetrakis(2-chloroethyl)2-butene-1,4-diphosphate.

6. A compound, as claimed in claim 5, identified as tetrakis(2-chloroethyl) ethylene diphosphate.

7. A compound, as claimed in claim 5, identified as tetrakis(2-chloroisopropyl) ethylene diphosphate.

8. A compound, as claimed in claim 5, identified as tetrakis(2-chloroethyl) p-phenylene diphosphate.

9. A compound, as claimed in claim 5, identified as tetrakis(2-chloroethyl) m-phenylene diphosphate.

10. A compound, as claimed in claim 5, identified as tetrakis(2-bromoethyl) ethylene diphosphate.

11. A compound, as claimed in claim 5, identified as tetrakis(2-chloroethyl) 2-butene-1,4-diphosphate.

References Cited

UNITED STATES PATENTS

| | | | |
|---|---|---|---|
| 3,192,242 | 6/1965 | Birum | 260—928 |
| 2,873,228 | 2/1959 | Willard et al. | 260—928 X |
| 3,102,067 | 8/1963 | Baker et al. | 260—928 X |
| 3,121,106 | 2/1964 | Nagy | 260—930 X |

FOREIGN PATENTS

| | | | |
|---|---|---|---|
| 1,202,501 | 10/1965 | Germany | 260—928 |

LEWIS GOTTS, Primary Examiner

R. L. RAYMOND, Assistant Examiner

U.S. Cl. X.R.

260—2.5 AJ, 930, 960, 973